July 11, 1933.  S. R. LARGE  1,917,987

ANTIFRICTION BEARING AND SEAL.

Filed Oct. 1, 1929

INVENTOR:
SAMUEL R. LARGE,
BY *Salvo P. Moore*
HIS ATTORNEY.

Patented July 11, 1933

1,917,987

UNITED STATES PATENT OFFICE

SAMUEL ROBERT LARGE, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

ANTIFRICTION BEARING AND SEAL

Application filed October 1, 1929. Serial No. 396,489.

This invention relates to antifriction bearings and seals and comprises all the features of novelty herein disclosed. An object of the invention is to provide a unit handling antifriction bearing and seal capable of unusually easy manufacture and assembly. Another object is to provide an improved sealing device for closing the space between inner and outer members which have relative rotation. To these ends and to improve generally and in detail upon devices of this character, the invention also consists in the various matters hereinafter described and claimed.

Figure 1:
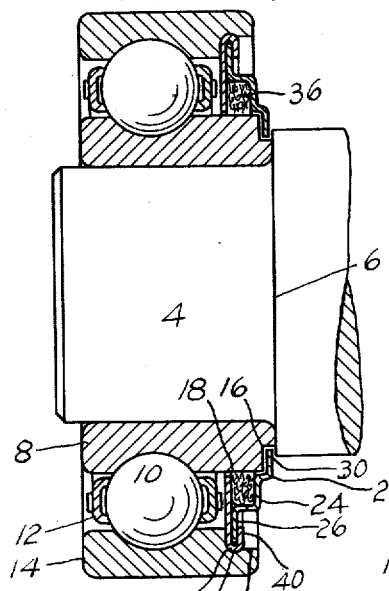

In its broader aspects, the invention is not necessarily limited to the specific construction selected for illustrative purposes in the accompanying drawing in which Fig. 1 is a diametrical section of a bearing and seal.

Figure 2:
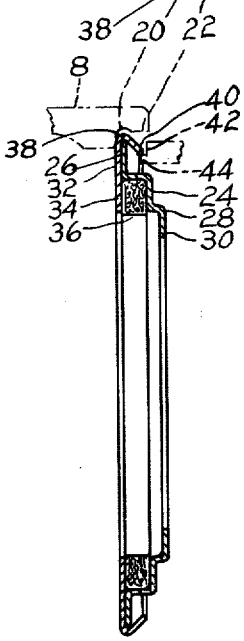

Fig. 2 is a diametrical section of the sealing device, broken lines indicating diagrammatically its relation to the bearing prior to its assembly therewith.

The performance of antifriction bearings is largely dependent upon lubrication and the adjunctive means for retaining lubricant and excluding foreign matter. When a manufacturer furnishes bearings only, and leaves the matter of lubrication and retention of lubricant to the used of the bearing, the product may not do itself justice by reason of improper lubrication. Hence it is desirable for the manufacturer to incorporate an efficient and foolproof sealing device with the bearing and furnish both things to the user. In the illustrated construction, a simple and efficient sealing device is shown attached to a ball bearing although the sealing device is also useful generally for closing a space between relatively rotatable members such as a shaft and a casing.

In Fig. 1, a shaft 4, having a locating shoulder 6, receives an antifriction bearing, herein shown as a ball bearing comprising an inner race member 8, a row of balls 10 having a cage 12, and an outer race member 14. In the illustrated construction, the inner race member 8 is wider than the outer race member and has its projecting end provided with a notch or edge recess 16. The race member desirably has a smoothing ground cylindrical face 18 adjacent to one end. The other or outer race member 14 has, near one end, a peripheral groove 20 with an overhanging rib or land 22. The groove is desirably arcuate in cross section and the land is a straight cylindrical surface which is of less diameter than the groove when these things are placed on the outer race member as distinguished from the inner. The outer race member is adapted for mounting in any suitable housing such, for instance, as the end bell of an electric motor if the shaft is a motor shaft, the end bell enclosing one end of the shaft and bearing, and making a seal unnecessary at this end.

The illustrated sealing device is a two part casing comprising a pair of connected rings which are themselves unit handling before attachment to the bearing. One ring has an intermediate cupped portion 24 and an outwardly extending straight side wall or flange 26. The ring also preferably has a second cupped portion 28 extending laterally and inwardly beyond the first cupped portion and terminating in a straight wall or flange 30. The other ring has a wall 32 with a straight or flat portion engaging flatwise against the wall or flange 36 and another portion 34 which is also preferably straight or flat and arranged opposite the cupped portion 24 to form a sealing recess or groove therewith. This recess or groove may be left empty but is preferably filled with grease, or better still, with a yieldable washer 36 of some such material as felt. The engaging walls 26 and 32 are united, as by bending one around the edge of the other. As shown, the ring having the wall 32 has its outer peripheral portion bent around the peripheral edge of the wall 26, as indicated at 38, and terminating in a flap or flange 40. The bending or arching of the outer portion of wall 32 over the outer edge of the wall 26 forms an externally rounded bead or fold capable of expansion into a holding groove. There is also formed an inwardly open groove whose opposed walls receive and tightly embrace the opposite sides of the wall 26.

The sealing device is unit handling when left in the condition illustrated in Fig. 2, the flap or flange 40 being partly bent. In this condition, the sealing device is applicable to a variety of situations where the space between relatively rotatable members is to be closed. When specially adapted for application to the bearing of Fig. 1, the wall or flange 26 is made of a diameter to pass freely within the land 22, and the bend at 38 also has such an external diameter that it will just pass the land 22 to come into registration with the groove 20. With the parts in the position illustrated in Fig. 2, the flap or flange 40 is bent down flatwise against the outer surface of the flange 26. This may be done conveniently by the edge 42 of a hollow punch or ram which exerts pressure axially of the bearing. The ram desirably has a rib 44 projecting within the terminal edge of the flap or flange 40 to insure an expansion of the bend or fold 38 into the groove 20 of the race member. This unites the sealing device to the race member. The felt washer 36 projects slightly from its recess or groove to run on the smoothly ground surface 18. The cupped portion 28 has running clearance with the edge or corner of the race member 8, and the terminal flange 30 enters and runs freely in the edge recess 16. The flange 30 is desirably extended inwardly past the shaft shoulder 6 to increase the labyrinthian effect of the seal. The flange 30 not only acts as an extra seal but has the important function of a seal guard which prevents grit from getting between the felt and the co-operating smooth surface 18 of the race ring and impairing the leak-preventing properties of the seal. The rings forming the sealing device are of a simple configuration which allows them to be conveniently stamped out of sheet metal and easily united together and to the race member.

I claim:

1. In a unit handling device, a two part casing comprising a pair of rings having portions spaced apart to form a groove, and one of the rings having its outer portion arched to form an externally rounded, peripherally extending bead and an inwardly open, peripherally extending groove receiving the peripheral edge of the other ring; substantially as described.

2. In a unit handling sealing device, a two part casing comprising a pair of rings, one of the rings having a cupped portion, the other ring having its inner portion forming a groove with the cupped portion, and the outer portion of the other ring being arched to form an externally rounded, peripherally extending bead and an inwardly open, peripherally extending groove receiving the outer edge of the cupped ring to hold the rings together; substantially as described.

3. In a unit handling sealing device, a two part casing forming a sealing groove and comprising a pair of rings, one of the rings having a cupped portion and having its side wall near the periphery engaging flatwise against the other ring, and one of the rings having its peripheral portion bent around to embrace opposite sides of the outer portion of the other ring to hold the rings together; substantially as described.

4. In a unit handling sealing device, a two part casing forming a sealing groove and guard therefor and comprising a pair of rings, one of the rings having its intermediate portion cupped and its outer portion formed with a straight outwardly extending flange, the inner portion of said ring having a cupped portion extending inwardly and laterally beyond the first cupped portion, the other ring engaging flatwise against the flange and having its inner portion arranged opposite to the first cupped portion to make a groove therewith, and said other ring having its outer portion bent around and enclosing the peripheral edge of the flange; substantially as described.

5. In a unit handling sealing device, a two part casing forming a sealing groove and guard therefor and comprising a pair of rings, one of the rings having its intermediate portion cupped and its outer portion formed with a straight outwardly extending flange, the inner portion of said ring having a cupped portion extending inwardly and laterally beyond the first cup portion, the other ring engaging flatwise against the flange and having its inner portion arranged opposite to the first cupped portion to make a groove therewith, and means for securing the rings together at the outer periphery; substantially as described.

6. In a unit handling sealing device, a yieldable washer and a casing for enclosing the yieldable washer, the casing comprising a pair of rings, one of the rings having its side wall near the periphery engaging flatwise against the other ring, and the other ring having its peripheral portion arched around and tightly enclosing the peripheral edge of the one ring to hold the rings together; substantially as described.

7. In a unit handling sealing device, a yieldable washer and a casing for enclosing the yieldable washer, the casing comprising a pair of rings, one of the rings having a cupped portion receiving the yieldable washer and a peripheral portion engaging flatwise against the other ring, and one of the rings having its peripheral portion formed with an inwardly open groove receiving the peripheral edge of the other ring to hold the rings together; substantially as described.

8. In a unit handling sealing device, a yieldable washer and a casing for holding the yieldable washer, the casing comprising a pair of rings, at least one of the rings having a cupped portion receiving the yieldable washer, one of the rings engaging the adjacent side wall of the other ring and having its peripheral portion bent around and enclosing the peripheral edge and a portion of the opposite side wall of the other ring; substantially as described.

9. In a unit handling sealing device, a yieldable washer and a casing for enclosing the yieldable washer, the casing comprising a pair of rings, one of the rings having one side wall near the periphery engaging flatwise against the other ring, and the other ring having its peripheral portion bent around and enclosing the peripheral edge of the one ring and engaging flatwise against the other side wall of said one ring; substantially as described.

10. In a unit handling sealing device, a yieldable washer and a casing for enclosing and guarding the yieldable washer, the casing comprising a pair of rings, one of the rings having a cupped portion receiving the yieldable washer and an additional cupped portion extending inwardly beyond the first cupped portion, the ring having its side wall near the outer periphery engaging flatwise against the other ring, and one of the rings having its peripheral portion bent around and enclosing the peripheral edge of the other ring; substantially as described.

11. In a unit handling antifriction bearing and seal, an inner race member, an outer race member, a casing comprising a pair of rings, the rings having portions spaced apart adjacent to one of the race members, a yieldable washer between the spaced portions and engaging the race member, and the rings having portions united by a fold and secured to the other race member at a point inside the end thereof; substantially as described.

12. In a unit handling antifriction bearing and seal, an inner race member, an outer race member, one of the race members having a groove near one end, a casing comprising a pair of rings, the rings having portions spaced apart near the other race member to form a sealing groove, and the rings having straight walls engaging one another, and one of the rings having a peripheral portion arched around and enclosing the peripheral portion of the other ring and the arched portion entering the groove of the race member; substantially as described.

13. In a unit handling antifriction bearing and seal, an inner race member, an outer race member, one of said race members having a groove with a land outside the groove, and a casing closing the space between said race members and comprising a pair of rings, one of the rings having a peripheral edge of a diameter to freely pass the land, and the other ring having a peripheral flap portion bent around said peripheral edge to expand said portion into the groove and unite the rings; substantially as described.

14. In a unit handling antifriction bearing and seal, an inner race member, an outer race member, one of said race members having a groove, and a casing closing the space between said race members and comprising a pair of rings, one of the rings having a cupped portion, the other ring having one portion forming a groove with the cupped portion and another portion bent around the cupped ring and having the bent portion expanded into the groove of the race member; substantially as described.

15. A unit handling antifriction bearing and seal, an inner race member, an outer race member, one of said race members having a groove, and a casing closing the space between said race members and comprising a pair of rings, one of the rings having a cupped portion and a side wall engaging flatwise against the other ring, and the other ring having a peripheral portion bent around the peripheral edge of the side wall and expanded into the groove; substantially as described.

16. In a unit handling antifriction bearing and seal, an inner race member, an outer race member, one of said race members having a groove and the other race member having a recessed edge, and a casing closing the space between said race members and comprising a pair of rings, one of the rings having its intermediate portion cupped and having another portion formed as a straight side wall, another portion of the ring having a cupped portion extending beyond the first cup portion and entering said edge recess, the other ring engaging said straight side wall and forming a groove with the first cupped portion, said other ring also having a peripheral portion bent around the edge of the side wall and expanded into the groove of the race member; substantially as described.

17. In a unit handling antifriction bearing and seal, an inner face member, an outer race member, one of said race members having a groove, a casing closing the space between the race members and comprising a pair of rings, one of the rings having a cupped portion and a straight side wall, a yieldable washer in the cupped portion and engaging one of the race members, the other ring engaging the straight wall and having a wall holding the yieldable washer in the cupped portion, and said other ring having a peripheral portion bent around said straight wall and expanded into the groove of the race member; substantially as described.

18. In a closure for bearings and the like, a closure plate having a side wall whose periphery is rounded and provided with an annular flap extending back in spaced relation to the side wall, a second plate having a portion extending between the side wall and the flap, and the flap being arranged at an angle to the side wall for lateral bending to expand the rounded periphery of the closure plate into a groove; substantially as described.

19. In a unit handling antifriction bearing and seal, an inner race member, an outer race member, a series of rolling elements, one of the race members having a rounded groove, a ring having a side wall whose edge is rounded and connected to an annular flap extending back along the side wall in spaced relation thereto, and the flap being exposed at the outer side of the side wall for lateral bending towards the side wall to expand the rounded portion of the ring into holding engagement with the groove; substantially as described.

20. In a closure for bearings and the like, a closure plate having a side wall whose periphery is rounded and provided with an annular flap extending back in spaced relation to the side wall, a second plate having a portion extending between the side wall and the flap, and the flap being arranged at an angle to the side wall; substantially as described.

21. In a unit handling antifriction bearing and seal, an inner race member, an outer race member, a series of rolling elements, one of the race members having a rounded groove, a ring having a side wall whose edge is rounded and connected to an annular flap extending back along the side wall in spaced relation thereto, and the flap being exposed at the outer side of the side wall; substantially as described.

In testimony whereof I hereunto affix my signature.

SAMUEL ROBERT LARGE.

CERTIFICATE OF CORRECTION.

Patent No. 1,917,987.   July 11, 1933.

SAMUEL ROBERT LARGE.

It is hereby certified that error appears in the printed specification of the above numbered patent requiring correction as follows: Page 1, line 30, for "used" read "user"; line 51, for "smoothing" read "smoothly"; and line 79, for "36" read "26"; page 3, line 81, claim 15, for "A" read "In a"; and line 112, claim 17, for "face" read "race"; and that the said Letters Patent should be read with these corrections therein that the same may conform to the record of the case in the Patent Office.

Signed and sealed this 15th day of August, A. D. 1933.

(Seal)

M. J. Moore.
Acting Commissioner of Patents.

portion extending between the side wall and the flap, and the flap being arranged at an angle to the side wall for lateral bending to expand the rounded periphery of the closure plate into a groove; substantially as described.

19. In a unit handling antifriction bearing and seal, an inner race member, an outer race member, a series of rolling elements, one of the race members having a rounded groove, a ring having a side wall whose edge is rounded and connected to an annular flap extending back along the side wall in spaced relation thereto, and the flap being exposed at the outer side of the side wall for lateral bending towards the side wall to expand the rounded portion of the ring into holding engagement with the groove; substantially as described.

20. In a closure for bearings and the like, a closure plate having a side wall whose periphery is rounded and provided with an annular flap extending back in spaced relation to the side wall, a second plate having a portion extending between the side wall and the flap, and the flap being arranged at an angle to the side wall; substantially as described.

21. In a unit handling antifriction bearing and seal, an inner race member, an outer race member, a series of rolling elements, one of the race members having a rounded groove, a ring having a side wall whose edge is rounded and connected to an annular flap extending back along the side wall in spaced relation thereto, and the flap being exposed at the outer side of the side wall; substantially as described.

In testimony whereof I hereunto affix my signature.

SAMUEL ROBERT LARGE.

CERTIFICATE OF CORRECTION.

Patent No. 1,917,987.     July 11, 1933.

SAMUEL ROBERT LARGE.

It is hereby certified that error appears in the printed specification of the above numbered patent requiring correction as follows: Page 1, line 30, for "used" read "user"; line 51, for "smoothing" read "smoothly"; and line 79, for "36" read "26"; page 3, line 81, claim 15, for "A" read "In a"; and line 112, claim 17, for "face" read "race"; and that the said Letters Patent should be read with these corrections therein that the same may conform to the record of the case in the Patent Office.

Signed and sealed this 15th day of August, A. D. 1933.

M. J. Moore.

(Seal)     Acting Commissioner of Patents.

CERTIFICATE OF CORRECTION.

Patent No. 1,917,987.                                                July 11, 1933.

SAMUEL ROBERT LARGE.

It is hereby certified that error appears in the printed specification of the above numbered patent requiring correction as follows: Page 1, line 30, for "used" read "user"; line 51, for "smoothing" read "smoothly"; and line 79, for "36" read "26"; page 3, line 81, claim 15, for "A" read "In a"; and line 112, claim 17, for "face" read "race"; and that the said Letters Patent should be read with these corrections therein that the same may conform to the record of the case in the Patent Office.

Signed and sealed this 15th day of August, A. D. 1933.

M. J. Moore.

(Seal)                                                              Acting Commissioner of Patents.